(12) United States Patent
Dakshinkar et al.

(10) Patent No.: US 11,558,759 B2
(45) Date of Patent: Jan. 17, 2023

(54) SYSTEMS AND METHODS FOR MINIMIZING LATENCY AND CONTENTION USING QOS FRAME SCHEDULING INFORMATION

(71) Applicant: HEWLETT PACKARD ENTERPRISE DEVELOPMENT LP, Houston, TX (US)

(72) Inventors: Abhiruchi Dakshinkar, Santa Clara, CA (US); Shubham Saloni, Santa Clara, CA (US); Gaurav Patwardhan, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 169 days.

(21) Appl. No.: 17/083,282

(22) Filed: Oct. 28, 2020

(65) Prior Publication Data
US 2022/0132331 A1    Apr. 28, 2022

(51) Int. Cl.
| | |
|---|---|
| *H04W 24/02* | (2009.01) |
| *H04W 24/08* | (2009.01) |
| *H04W 72/12* | (2009.01) |
| *H04W 84/12* | (2009.01) |
| *H04W 88/08* | (2009.01) |
| *H04W 28/06* | (2009.01) |

(52) U.S. Cl.
CPC ........... *H04W 24/02* (2013.01); *H04W 24/08* (2013.01); *H04W 72/1236* (2013.01); *H04W 72/1284* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,523,377 B2 | 12/2019 | Tsai et al. | |
| 2006/0062189 A1* | 3/2006 | Takeuchi | H04W 74/0875 |
| | | | 370/412 |

(Continued)

FOREIGN PATENT DOCUMENTS

| | | |
|---|---|---|
| KR | 20170062719 | 6/2017 |

OTHER PUBLICATIONS

Stanley, D., et al., IEEE P802.11ax™/D6.0 Amendment 1: Enhancements for High Efficiency WLAN (Research Paper), IEEE Computer Society, Nov. 2019, 780 Pgs.

*Primary Examiner* — Faruk Hamza
*Assistant Examiner* — Cassandra L Decker
(74) *Attorney, Agent, or Firm* — Sheppard Mullin Richter & Hampton LLP

(57) ABSTRACT

Systems and methods are provided for leveraging uplink (U)L scheduling information obtained by way of Quality of Service (QoS) Null/QoS Data frames and Media Access Control (MAC) headers transmitted by any station (STA). This UL scheduling information can be read by any access point (AP) in an extended service set (ESS), and used to improve network performance. For example, an AP may use such UL scheduling information (from STAs associated to co-channel APs in the same ESS) to minimize the latency for UL latency-sensitive traffic in that ESS. Additionally, an AP may use such UL scheduling information to minimize contention amongst STAs connected to different APs on the same channel in the same ESS, thereby improving system capacity.

15 Claims, 7 Drawing Sheets

(56) References Cited

U.S. PATENT DOCUMENTS

| | | | |
|---|---|---|---|
| 2008/0095124 A1* | 4/2008 | Ramos | H04W 28/02 |
| | | | 370/336 |
| 2009/0097406 A1* | 4/2009 | Nilakantan | H04L 45/38 |
| | | | 370/235 |
| 2016/0157266 A1* | 6/2016 | Wang | H04W 56/0005 |
| | | | 370/336 |
| 2016/0295580 A1* | 10/2016 | Katar | H04W 72/0446 |
| 2017/0230988 A1 | 8/2017 | Zhou et al. | |
| 2018/0103390 A1* | 4/2018 | Zhou | H04W 74/0816 |
| 2018/0242355 A1* | 8/2018 | Lou | H04W 72/121 |
| 2019/0274171 A1 | 9/2019 | Viger et al. | |
| 2021/0281364 A1* | 9/2021 | Yeh | H04L 1/1854 |
| 2021/0337413 A1* | 10/2021 | Rumsby | H04W 24/10 |

* cited by examiner

SYSTEMS AND METHODS FOR MINIMIZING LATENCY AND CONTENTION USING QOS FRAME SCHEDULING INFORMATION

DESCRIPTION OF RELATED ART

In recent years, Wireless Local Area Network (WLAN) technologies have emerged as a fast-growing market. One example of the various WLAN technologies is the Institute of Electrical and Electronics Engineers (IEEE) 802.11 standard. Client devices or stations (STAB) within WLANs communicate with access points (APs) to obtain access to one or more network resources. APs can refer to digital devices that may be communicatively coupled to one or more networks (e.g., Internet, an intranet, etc.). APs may be directly connected to the one or more networks or connected via a controller. An AP, as referred to herein, may include a wireless access point (WAP) that communicates wirelessly with devices using Wi-Fi, Bluetooth or related standards and that communicates with a wired network.

APs configure various parameters for communicating with other devices, and for supporting real time services while meeting Quality of Service (QoS) requirements. The specific values configured for various parameters determine the performance of an AP such as speed and reliability.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
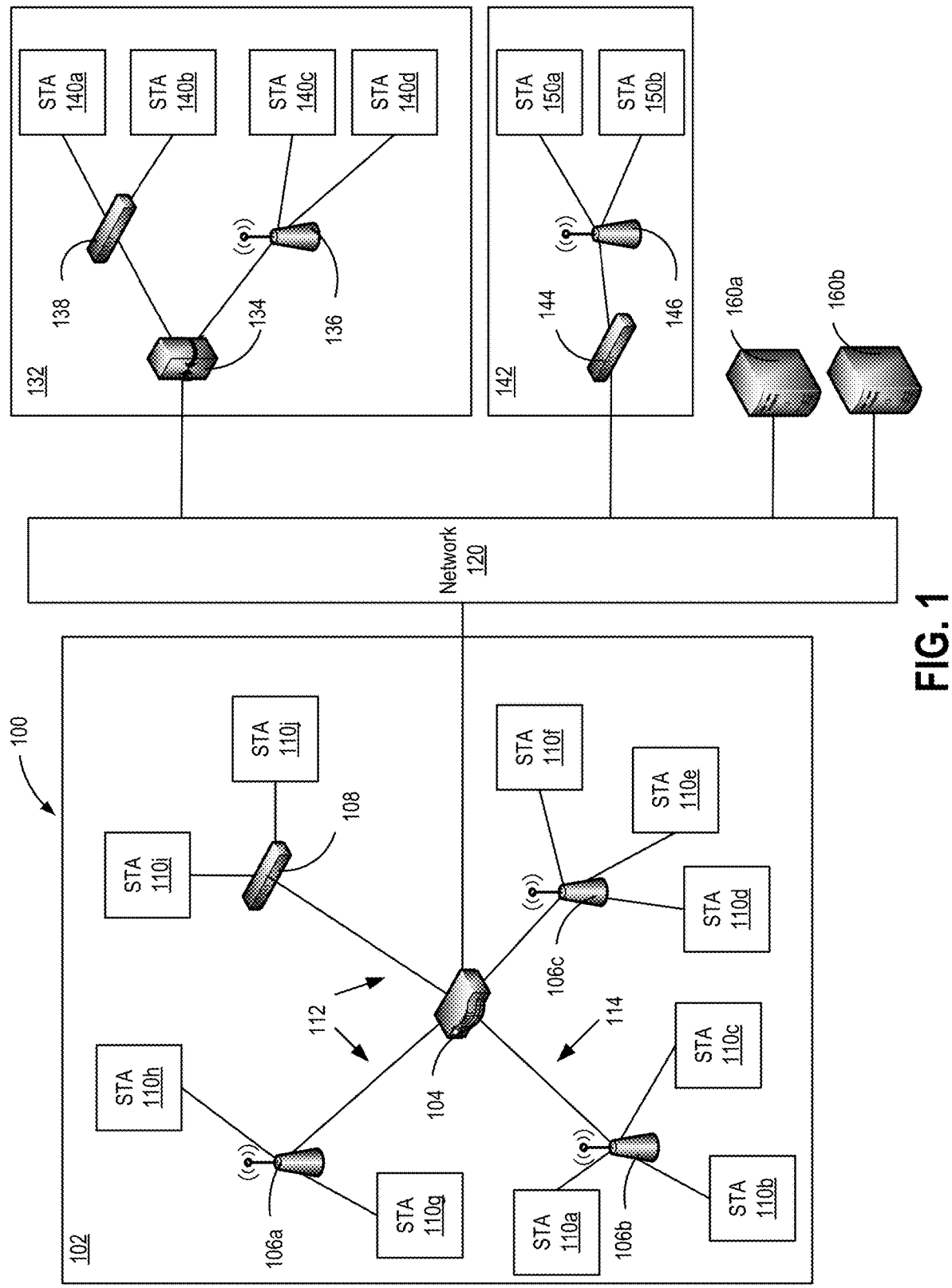
FIG. 1 illustrates an example wireless network deployment in which latency and contention minimization can be implemented in accordance with various embodiments.

The figures are not exhaustive and do not limit the present disclosure to the precise form disclosed.

DETAILED DESCRIPTION

A quality of service (QoS) Null frame refers to an 802.11 QoS data frame that does not contain any data. In the pre-802.11ax world, an important use of the QoS NULL frame was to carry the current power-save state of a non-AP STA. However, the 802.11ax specification has since enhanced QoS Null and QoS data frames to carry uplink (UL) scheduling information in the QoS control field and the high efficiency (HE) variant of high throughput (HT) control field of the media access control (MAC) header. Being part of the MAC header, this UL scheduling information is unencrypted, and can be read by any 802.11ax-compatible device that receives QoS Null frame correctly.

In particular, the QoS control field indicates the data buffered for a specific traffic identifier (TID) at a transmitting station (STA). That is, a QoS control field may be made up of five subfields, including TID information, end of service (EOSP) information, acknowledgement (ACK) policy information, transmission opportunity (TXOP) limit or UL queue size information and A-MSDU present. The HE variant of the HT control field which may be optionally present in QoS Data/QoS NULL frame contains a STA's capability to perform UL multi-user (MU) transmissions or buffer status information used for UL MU operation, etc.

Currently, and although freely available, neighboring co-channel APs do not leverage/take advantage of this UL scheduling information sent by non-AP STAs. Accordingly, various embodiments are directed to leveraging UL scheduling information (e.g., buffered data and STA capability information) obtained by way of QoS Null/QoS Data frames and MAC headers transmitted by any STA. This UL scheduling information can be read by any AP in an ESS, and used to improve network performance. That is, UL scheduling information from neighboring co-channel APs at/by an AP in the same extended service set (ESS) can receive and parse the information. For example, an AP may use such UL scheduling information (from STAs associated to co-channel APs in the same ESS) to minimize the latency for UL latency-sensitive traffic in that ESS. Additionally, an AP may use such UL scheduling information to minimize contention amongst STAs connected to different APs on the same channel in the same ESS, thereby improving system capacity.

It should be understood that traffic such as voice and video (described below in the context of access categories (ACs)) can be deemed to be latency-sensitive, while best-effort and background traffic/traffic type ACs are not considered to be latency-sensitive. Thus, the aforementioned minimization of latency can be applied to UL latency-sensitive traffic such as voice or video traffic, while the aforementioned contention minimization can be applied to STAs transmitting traffic in/associated with best-effort and background ACs.

In particular, an AP with associated clients or STAs will not typically enter a power-save mode, and will discard OBSS frames. However, when an AP is not transmitting data, the AP can sniff and parse valid OBSS frames of interest to gain useful scheduling information. It should be understood that an OBSS frame is considered valid by an AP if it is transmitted by a STA and passes a cyclical redundancy check (CRC) check. Since the information of interest, namely QOS control fields and HE variant of the HT control fields, are part of the MAC header and hence unencrypted, the CRC validation can be deemed sufficient to trust the information contained in an OBSS frame.

The aforementioned OBSS frames of interest can include the following frames: single-user (SU) UL QoS NULL frames, buffer status report poll (BSRP) and subsequent QoS NULL frames received as part of UL-Orthogonal Frequency Division Multiple Access (OFDMA) transmissions, Basic Trigger frames and subsequent QoS Data or QoS NULL frames received as part of UL-OFDMA transmissions, and UL SU QoS Data frames. These OBSS frames may be transmitted by STAs associated to an AP or by STAs associated to one or more other APs belonging to the same ESS (i.e., can be part of co-channel OBSS in the ESS).

It should be noted that according to the 802.11 standard, a service set or ESS can refer to a group of wireless network devices that are identified by the same service set identifier (SSID) or "network name." An ESS or service set forms a logical network operating with the same level 2 networking parameters, i.e., they are on the same logical network segment, e.g., Internet Protocol (IP) subnet or virtual LAN (VLAN). On the other hand, a basic service set (BSS) can refer to a subgroup of devices with a service set that (in addition to operating on the same level 2 networking parameters to form a logical network) operate within the same physical layer medium access characteristics, e.g., RF, modulation scheme, security settings, etc. such that they are wirelessly networked. Thus, in an enterprise WLAN network, multiple BSSs can be controlled such that network devices can be clustered in different BSS networks.

It should also be noted that the 802.11ax specification introduces AP-initiated, trigger-based UL MU transmissions. In order to schedule UL transmissions, an AP may need information about the data buffered at a client or STA that is waiting to be transmitted. For example, an AP may transmit BSRP trigger frames to procure this information by allocating resources units (RUs) for the UL response. The STAs that are solicited by the AP will respond to the BSRP trigger frames with QoS NULL frames carrying the BSR in the suggested Resource Units (RUs). The STAs may also send unsolicited BSRs in QOS NULL or QOS Data frames. These QoS Null frames may be part of SU or MU transmissions. While these frames from a STA are received for parsing at the AP to which the STA is associated, the QoS Null frames, as alluded to above, may also be "overheard" by some neighboring co-channel APs.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices/STAs 110a-j. Using a connection to a switch 108 or AP 106a-c, a STA 110a-j may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IoT) devices, and the like.

Within the primary site 102, a switch 108 is included as one example of a point of access to the network established in primary site 102 for wired STA 110i-j. STAs 110i-j may connect to the switch 108 and through the switch 108, may be able to access other devices within the network configuration 100. STAs 110i-j may also be able to access the network 120, through the switch 108. The STAs 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for STAs 110a-h. Each of APs 106a-c may be a combination of hardware, software, and/or firmware that is configured to provide wireless network connectivity to wireless STAs 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

It should be noted that APs, such as AP 130, AP 132, and AP 134 are enabled to implement VAPs, namely, support for one or more multiple distinct SSID values over a single AP radio with unique media access control (MAC) addresses per SSID (i.e., BSSID). As is known, an SSID is a field between 0 and 32 octets that may be included as an Information Element (IE) within management frames. In the context of the 802.11 standard, management frames supporting the SSID IE include the beacon, probe request/response, and association/reassociation request frames. In one embodiment, an AP supports VAPs using multiple BSSIDs. Each beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. In one embodiment, an AP may advertise up to a given number (e.g., 16) of beacons, each with a different BSSID to provide the VAP support. Each VAP may have a unique MAC address, and each beacon may have a network name.

It should be understood that wireless communications as contemplated herein may involve the configuration of one or more parameters which determine a QoS for communication by or with WLAN devices, such as, e.g., APs. Parameter values determine how frequently WLAN devices request access to a radio frequency channel and/or use a radio frequency channel. Parameter values for a particular WLAN device that result in a radio frequency channel (or an overlapping portion of two radio frequency channels) being accessed more often by that particular WLAN device relative to other WLAN devices may be referred to herein as aggressive parameter values. In addition, parameter values that are more aggressive relative to default or industry-standard parameter values for obtaining channel access may also be referred to herein as aggressive parameter values. Examples of parameters are Enhanced Distributed Channel Access (EDCA) parameters and Hybrid Coordination Function Controlled Channel Access (HCCA) parameters.

EDCA parameters may include, but are not limited to the following:

a. Access Category (AC)—An AC parameter refers to one of a voice (VO) AC, a video (VI) AC, a best effort (BE) AC, and a background (BK) AC. There may be more ACs as described in the 802.11 standard, and each AC may be associated with a different priority level.

b. Arbitration Inter-Frame Spacing (AIFS)—A time interval between frames being transmitted under the IEEE 802.11 standard.

c. Minimum Contention Window (CWmin)—Input to an algorithm that determines the initial random backoff wait time for retrying a transmission in response to a failed attempt (for example, due to unavailability of an RF channel). The random backoff wait time may be increased when a frame transmission is unsuccessful due to the channel being unavailable for the transmission.

d. Maximum Contention Window (CWmax)—The maximum random backoff wait time.

f. Transmission Opportunity (TXOP) Limit—An interval of time when a STA has the right to initiate transmissions toward an AP and vice-versa, and send as many frames as possible. These frames can be SIFS separated and this exchange is referred to as a "burst".

In some embodiments, and as alluded to above, ACs are defined for classifying network traffic. Each AC (configured for an AP) is associated with a corresponding set of parameter values. The transmission of frames classified under a particular AC can be transmitted according to the set of parameter values corresponding to that particular AC. That is, ACs can be likened to queues that an AP can populate with data, and from which that data can be transmitted. Typically, there are four types of ACs (alluded to above, and described in greater detail below) that can be assigned to different types of applications, each having its own particular QoS requirements/parameters. Moreover, once an AC is assigned to an application type, the manner in which traffic/data is queued in an AC, along with the manner in which traffic/data is taken out of the queue can be configured. It should be understood that a particular AC can be associated with one or more queues/sub-queues.

Table 1 below shows an example of four ACs (background (BK), best effort (BE), video (VI), and voice (VO)) and respective parameter values as configured for a first AP.

| AC | CWmin | CWmax | AIFS | Max. TXOP |
|---|---|---|---|---|
| Background (BK) | 15 | 1023 | 7 | 0 |
| Best Effort (BE) | 15 | 1023 | 3 | 0 |
| Video (VI) | 7 | 15 | 2 | 3.008 ms |
| Voice (VO) | 3 | 7 | 2 | 1.5404 ms |

Table 1

In the above example, frames classified under the video category are transmitted by the first AP using value 7 for CWmin, value 15 for CWmax, and value 2 for AIFS. A second AP may be configured differently than the first AP by using different parameter values.

Table 2 below shows an example of four ACs and associated parameter values as configured for a second AP that is different than the first AP.

TABLE 2

| AC | CWmin | CWmax | AIFS | Max. TXOP |
|---|---|---|---|---|
| Background (BK) | 15 | 1023 | 7 | 0 |
| Best Effort (BE) | 15 | 1023 | 3 | 0 |
| Video (VI) | 5 | 10 | 1 | 3.008 ms |
| Voice (VO) | 3 | 7 | 2 | 1.5404 ms |

In the above example, frames classified under the VI AC are transmitted by the second AP using value 5 for CWmin, value 10 for CWmax, and value 1 for AIFS. The second AP can be configured more aggressively than the first AP because the second AP has lower values for CWmin, CWmax, and AIFS. This can result in more frequent attempts to obtain channel access and more frequent transmission of frames.

The first AP and the second AP compete for access to the shared radio frequency channel. In an example, the first AP attempts to transmit packets for a particular video stream at the same time the second AP is transmitting a first set of packets for another video stream. Since the radio frequency channel is unavailable to the first AP (the radio frequency channel is being used by the second AP to send the first set of packets), the first AP again attempts to transmit after a random period of time that is computed based at least on CWmin and CWmax. The random period of time may be referred to herein as a random backoff time. However, the second AP may be transmitting a second set of packets when the first AP attempts again because the lower values for CWmin and CWmax used by the second AP result in the second AP requesting channel access more frequently than the first AP. Furthermore, the second AP transmits more frames per time period than the first AP because the AIFS parameter value is lower for the second AP. The difference in parameter values results in the second AP using a channel, shared with the first AP, for a larger percentage of time than the first AP to transmit video data.

Figure 2A:
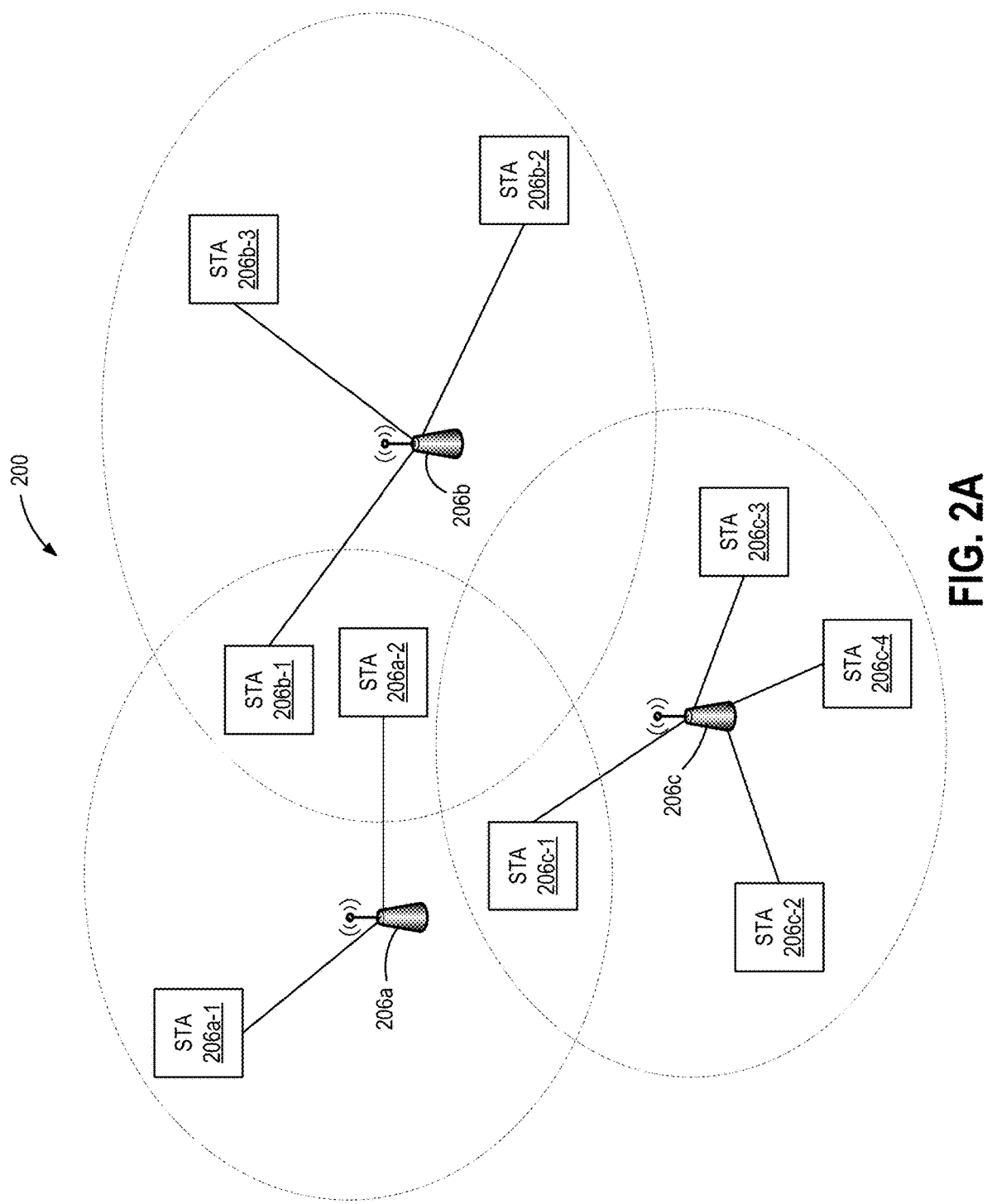
FIG. 2A illustrates an example overlapping base service set (OBSS) scenario with multiple access points (APs) that belong to the same extended service set (ESS).

FIG. 2A is a schematic representation of an example OBSS scenario, where APs in the same ESS may overhear information being transmitted between STAs and other APs. That is, FIG. 2A illustrates a WLAN network 200 that includes, as an example, three APs, AP 206a, AP 206b, and AP 206c, all of which are part of the same ESS, and experience co-channel OBSS. In this particular example, which is not meant to limiting in any way (with respect to the number of APs and STAs, the connectivity between APs and STAs, and the manner in which co-channel OBSS may be realized or effectuated), STAs 206a-1 and 206a-2 are associated to AP 206a. STAs 206b-1, 206b-2, and 206b-3 are associated to AP 206b. STAs 206c-1, 206c-2, 206c-3, and 206c-4 are each associated to AP 206c.

As can be appreciated, AP 206a receives frames from STAs 206a-1 and 206a-2 (both of which are associated to AP 206a), but AP 206a will also receive frames from STA 206b-1 (associated to AP 206b) and from STA 206c-1 (associated to AP 206c). Similarly, in addition to receiving frames from its associated STAs, i.e., STAs 206b-1, 206b-2, and 206b-3, AP 206b will also receive frames from STA 206a-2 (associated to AP 206a). Accordingly, and as alluded to above, UL scheduling information from STA 206b-1 and from STA 206c-1 can be used by AP 206a to improve performance of the ESS (minimize latency and/or minimize contention depending on the type of traffic queued in each STA) in addition to the UL scheduling information from its own associated STAs, i.e., STAs 206a-1 and 206a-2. Likewise, AP 206b can utilize the UL scheduling information transmitted by STA 206a-2, which is associated to AP 206a, in addition to the UL scheduling information from its own associated STAs, i.e., STAs 206b-1, 206b-2, and 206b-3.

Figure 2B:
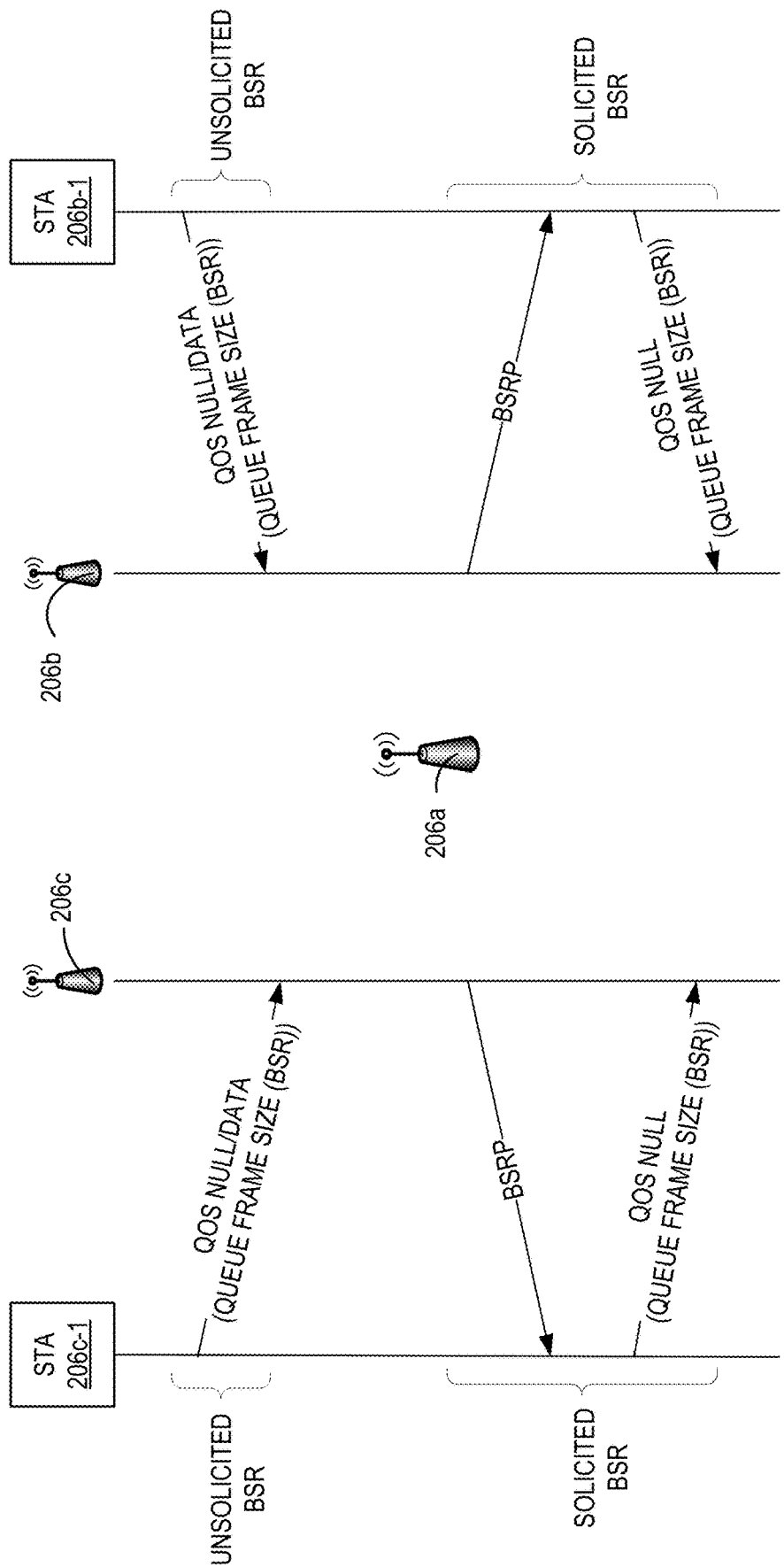
FIG. 2B illustrates an example access point (AP) obtaining uplink (UL) scheduling information from stations (STAB) belong to another BSS as a result of co-channel OBSS.

FIG. 2B illustrates an example message flow that includes QoS null data being overheard by an AP. As illustrated in FIG. 2B, an AP, i.e., AP 206a may be associated with STAs 206a-1 and 206a-2 (FIG. 2A). However, in the example OBSS scenario of FIG. 2A, AP 206a is in the same ESS, and sharing the same channel(s) as APs 206b and 206c to which STAs 206b-1 and 206c-1 are associated, respectfully. Thus, AP 206a may receive and parse QoS NULL/Data frames from STAs 206b-1 and 206c-1. Accordingly, AP 206a may become aware of the UL scheduling information (the UL buffered data for transmission) contained in those QoS NULL/Data frames.

For example, STA 206c-1 may transmit unsolicited BSRs vis-à-vis QoS NULL/Data frames to AP 206c. In the case of solicited BSRs, AP 206c may transmit a BSRP (i.e., a trigger frame indicating a request for BSR information) to STA 206c-1. STA 206c-1 may then respond to AP 206c by transmitting a QoS NULL frame that includes BSR information, e.g., its queue frame size, to AP 206c in order to allow AP 206c to schedule UL traffic. It should be noted that AP 206c will allocate RUs upon transmitting the BSRP, and STA 206c-1 will transmit the QoS NULL frame(s) carrying the BSR information in the allocated RUs. Likewise, STA 206b-1 may transmit unsolicited BSRs vis-à-vis QoS NULL/Data frames to AP 206b. Additionally, AP 206b may transmit a BSRP to STA 206b-1 (in a solicited scenario). STA 206b-1 may then respond to AP 206b by transmitting a QoS NULL frame that includes BSR information, e.g., its queue frame size, to AP 206b in order to allow AP 206b to schedule UL traffic.

Figure 3A:
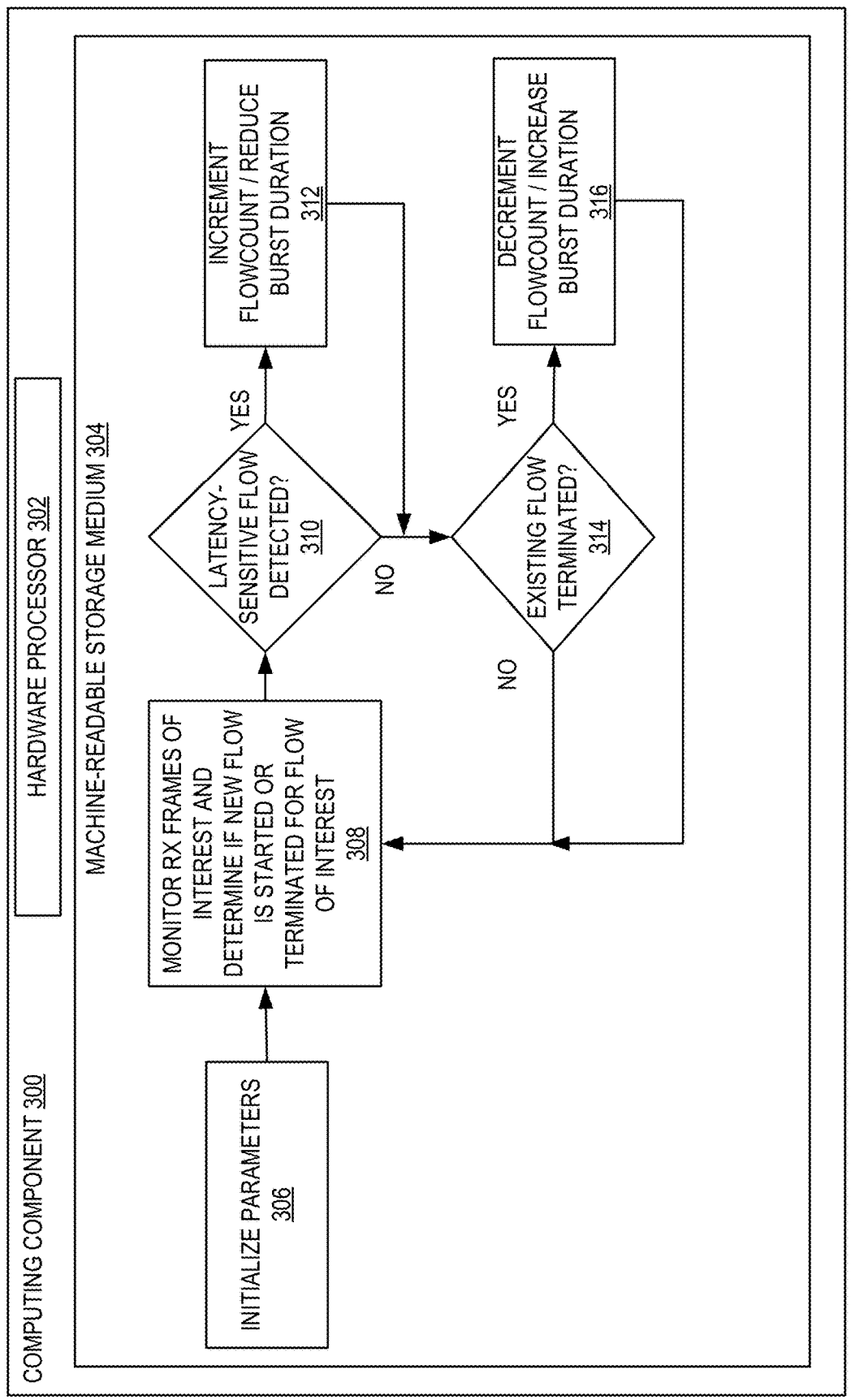
FIG. 3A illustrates an example computing component for minimizing latency for UL latency-sensitive traffic in accordance with various embodiments.

FIG. 3A is a block diagram of an example computing component or device 300 for minimizing latency for UL latency-sensitive traffic (e.g., by monitoring latency-sensitive flows/flowcount and adjusting transmission burst duration accordingly in accordance with one embodiment. Computing component 300 may be, for example, a server computer, a controller, or any other similar computing component capable of processing data. In the example implementation of FIG. 3A, computing component 300 includes a hardware processor, 302, and machine-readable storage medium, 304. In some embodiments, computing component 300 may be an embodiment of a controller, e.g., a controller such as controller 104 (FIG. 1), or another component of wireless network 100, e.g., an AP such as AP 106a (FIG. 1), for example.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-316, to control processes or operations for prioritizing bi-directional traffic flows. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-316.

Hardware processor 302 may execute instruction 306 to initialize parameters in preparation for monitoring and adjusting transmission burst duration. It should be noted that the transmission burst duration at issue is the transmission burst duration for BE and BK AC traffic. Initializing parameters can refer to setting the flowcount parameter value to zero, and minimum burst duration and maximum allowed duration can be non-zero values commensurate with, e.g., default settings or as desired in the network.

Hardware processor 302 may execute instruction 308 to monitor received frames of interest and determine if new flows have either started, or have terminated relative to a flow of interest. The flow of interest can be determined based on TID. As noted above, (OBSS) frames of interest can include the following frames: SU UL QoS NULL frames, BSRP, subsequent QoS NULL frames received as part of UL-OFDMA transmissions, Basic Trigger Frames and subsequent QoS Data or QoS NULL frames received as part of UL-OFDMA transmissions, and UL SU QoS data frames. TID of interest can refer to latency-sensitive traffic, i.e., traffic falling into the VO and VI ACs.

Accordingly, hardware processor 302 may execute instruction 310 to determine if a latency-sensitive flow is detected. It should be understood that flows can be defined as a set of packets corresponding to/having the same traffic identifier (TID) and/or AC.

Hardware processor 302 may execute instruction 312 to increment flowcount and reduce burst duration. That is, If a latency-sensitive flow is detected, the flowcount value (or flowcount counter, depending on the manner in which flowcount is implemented) is incremented, e.g., by one. Moreover, so long as the current transmission burst duration is not yet at the minimum specified transmission burst duration, the current transmission burst duration can be reduced by half. This reduction in transmission burst duration can continue repeatedly so long as latency-sensitive flows are detected/ongoing and the minimum specified transmission burst duration has not yet been reached. The following is an example algorithm/function representative of this instruction.

```
If (new flow is detected){
  Flowcount += 1
  If ((txBurst_current = floor(txBurst_current /2)) < Min_burst_duration ){
    txBurst_current = Min_burst_duration
  }
}
```

If no latency-sensitive flow is detected or if the current transmission burst duration parameter has reached the minimum specified transmission burst duration, hardware processor 302 may execute instruction 314 to determine if an existing flow has been terminated. Again, an AP may sniff packet streams it overhears from STAs associated to co-channel APs in the same ESS.

Hardware processor 302 may execute instruction 316 to decrement flowcount and increase burst duration in the event that an existing flow has indeed been terminated/ends. It should be understood that, various embodiments implement some form of incrementing/decrementing of burst duration values in a manner that allows for performance optimization in the context of latency and contention. Although various mechanisms can be used to effectuate this incrementing/decrementing of burst duration values, one example can be an adaptation of an additive-increase multiplicative-decrease algorithm. In general, the amounts by which such values are increased/decreased can vary, although typically, the increase of values (for burst duration) is configured to occur more slowly relative to the rate at which values (for burst duration) are decreased. Thus, although (as described in this embodiment), transmission burst duration is reduced by half and burst duration is increased by one, other values, orders of change, delta ratios (increase to decrease amounts) can be used. For example, in accordance with one embodiment, the flowcount may be decremented, e.g., by a value of one, and the current transmission burst duration can be also be increased by a value of one. Similar to the manner in which flowcount is incremented and burst duration is decremented, this increase in flowcount and burst duration can continually repeat so long as no latency-sensitive flow is detected by an AP (based on its own associated STAs or those associated to co-channel APs in the same ESS). The following is an example algorithm/function representative of this instruction.

```
Else If (detection of a termination of a flow) {
  Flowcount -=1
  If ((txBurst_current += 1) > MAX_ALLOWED) {
    txBurst_current =MAX_ALLOWED
  }
}
```

It should be understood that by reducing the current transmission burst duration for flows belonging to the BE and BK ACs, more opportunity is given to the latency-sensitive flows (i.e., traffic belonging/corresponding to the VO/VI ACs) to transmit queued data. Moreover, because an AP is cognizant of the latency-sensitive flows from any STA associated to any neighboring co-channel AP in the same ESS, the adaptation of transmission burst duration takes into account any/all STAs in an ESS, not just those STAs associated to a particular AP, which can translate into more robust/accurate assessment of flows and adaptation.

Figure 3B:
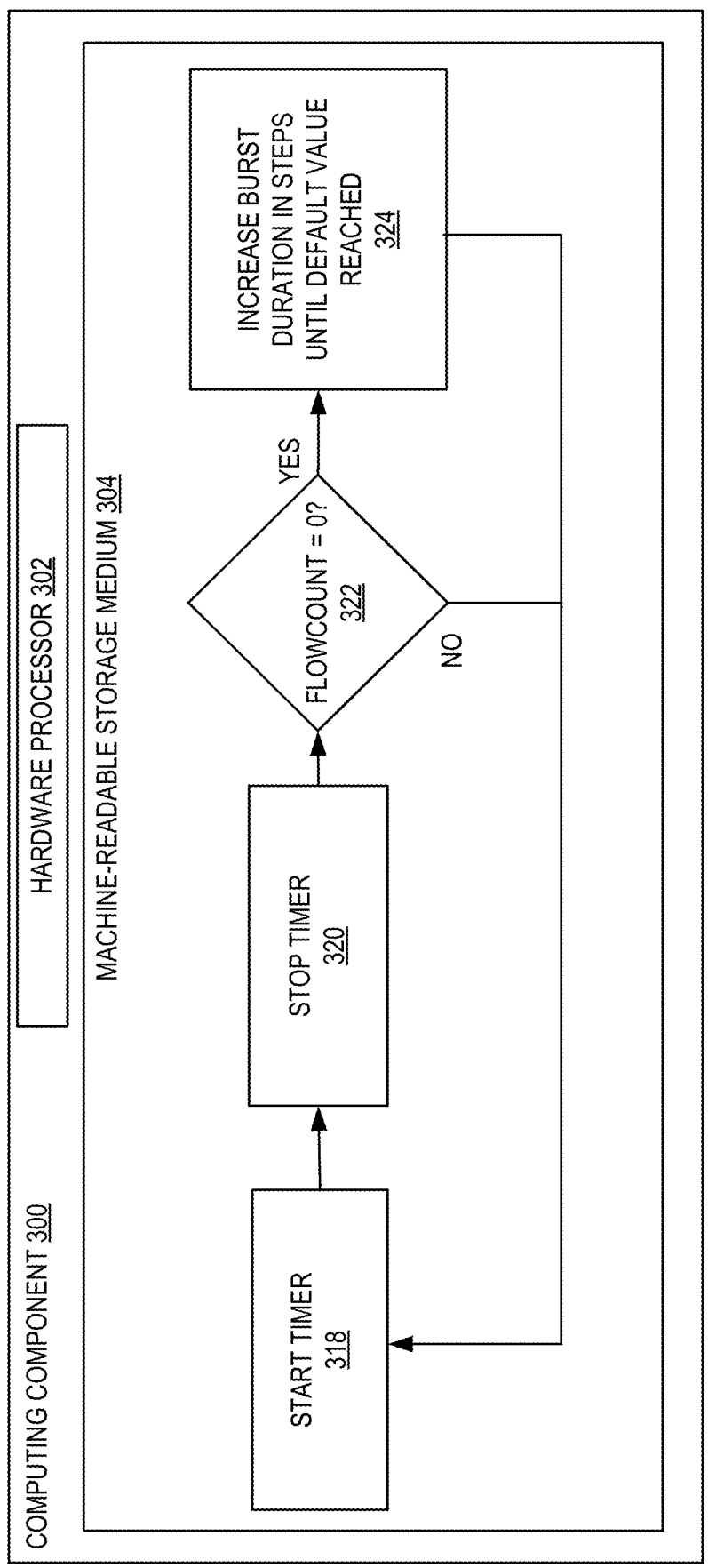
FIG. 3B illustrates the example computing component of FIG. 3A for a parallel minimizing latency process for UL latency-sensitive traffic in accordance with various embodiments.

FIG. 3B illustrates a mechanism for increasing burst duration based on beacon interval (or other defined interval) that can be periodically effectuated in parallel with the adaptation mechanism set forth in FIG. 3A and described above. That is, hardware processor 302 may execute instruction 318 to start a timer corresponding to a defined period. As noted above, the defined period can be a beacon interval or other, e.g., user/system-defined interval. At a high level, when no latency-sensitive traffic/flow is detected from any STAs in the ESS (that an AP may overhear), the current transmission burst duration for BE and BK AC traffic can be increased. Thus, if no voice or video traffic is detected on a channel, the opportunities for BK and BE traffic to be transmitted in the UL direction can be increased so as to increase UL throughput.

The relevant period or interval may progress until hardware processor 302 executes instruction 320 stop the relevant timer when the period (P) has expired. Subsequently, hardware processor 302 may execute instruction 322 to determine if the flowcount value is zero. If not (and the relevant period has expired/elapsed), the timer may be again started. However, if the flowcount is zero, indicating that there is no latency-sensitive flow that is currently active for any STA associated to, or that the AP overhears (queued or transmitted), hardware processor 302 may execute instruction 324 to increase burst duration, in steps/incrementally until a default value is reached. The following is an example algorithm/function representative of this instruction, where the default value can, in some embodiments, be a maximum allowed burst duration.

```
If (Flowcount == 0 AND beacon_interval_timeout){
    If ((txBurst_current += 1) > MAX_ALLOWED) {
        txBurst_current =MAX_ALLOWED
    }
}
```

To provide context for the use of such mechanisms, a typical deployment scenario can involve APs servicing conference rooms. When voice is being streamed, nearby, co-channel APs can reduce their bursting, thereby freeing up the channel/medium for an AP with VO (or VI) traffic. Once the conference ends, the additive increase in burst duration can assist nearby APs to return to their normal/usual operating mode for non-VO (or VI) traffic.

As noted above, the UL scheduling information that can be gleaned from STAs (not necessarily associated to an AP) may be used to minimize contention amongst STAs connected to different co-channel APs. In this way, overall system capacity can be improved.

It is well understood that higher CWmin values in the EDCA parameters advertised by an AP (described above) result in lower chances of collision for STAs attempting SU UL traffic. Accordingly, some embodiments disclosed herein describe a mechanism/algorithm for dynamically modifying or adapting the value of the CWmin parameter as a function of UL queued traffic. It should be understood that this mechanism is applied only in the case of traffic comporting with the BE and BK ACs. Thus, default channel access parameters can remain unchanged for VO and VI AC traffic due to their respective latency-sensitive requirements. In other words, the number of contending STAs corresponding to the BK and BE ACs can be determined, and the value of the CWmin parameter can be based on determination. It should be understood that although the value of CWmin is discussed herein, other EDCA parameters can be similarly modified/adapted. For example, in some embodiments modification of the CWmin parameter may result in or may be modified in conjunction with the AIFS number (AIFSN) as well as the CWmax parameter. One of ordinary skill in the art would understand how other EDCA parameters could be modified in line with modification of the CWmin parameter.

In some embodiments, certain network characteristics may be leveraged, including the following:

At any instance, an AP can ascertain the amount of queued UL traffic of a specific TID/AC at a STA by processing the BSR in the QoS frames;

EDCA is a priority-based channel access mechanism in which higher priority traffic queued at a STA has a higher chance of transmission than lower priority queued traffic.

802.11ax-compliant STAs are capable of UL MU transmissions. Hence, UL data may make its way to an AP either via SU or MU transmissions. There is a category of STAs that do not support UL MU data transmission, and hence such STAs may resort to UL SU transmissions only. Those STAs that do support UL MU transmissions may get scheduled by an AP in the UL direction as part of trigger-based MU transmissions. Accordingly, such STAs may not need a medium/channel access opportunity to transmit their queued data for UL transmission.

It should be understood that each AP in an ESS runs a timer with a period, T, to calculate the value of CWmin advertised in the EDCA parameters of its next beacon. The STAs evaluated in the algorithm are not restricted to the AP BSS. Again, various embodiments are directed to leveraging UL scheduling information regarding any co-channel STA from/within the ESS which the AP can hear. The following sets forth certain definitions that may be used to effectuate contention minimization in accordance with some embodiments:

N_STA_no_MU(AC) can refer to the number of non-MU capable STAS with queued UL data of a particular AC. As noted above, only BE and BK ACs are considered for this contention minimization mechanism.

N_STA_MU(AC) can refer to the number of MU capable STAS with queued UL data of a particular AC.

N_STA(AC) can refer to the effective number of STAs possibly attempting UL SU transmission for a particular AC.

W(AC) can refer to some value (<1) that is a weight that can be applied to N_STA_MU(AC) while calculating N_STA(AC). The value being less than one accounts for the fact that only a fraction of MU capable STAs will actually contend for UL SU transmissions.

Figure 3C:
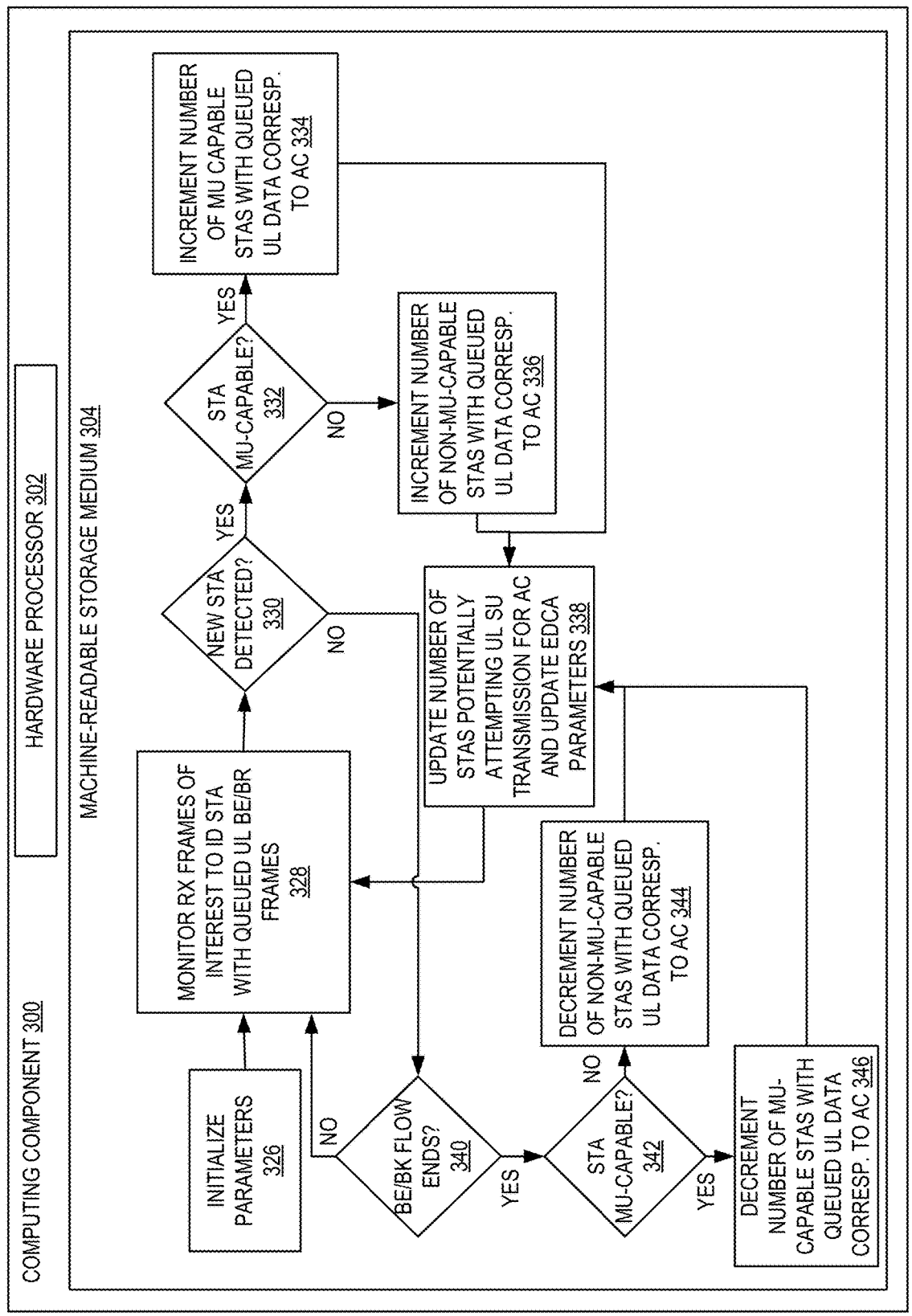
FIG. 3C illustrates the example computing component for minimizing contention for UL non-latency-sensitive traffic in accordance with various embodiments.

Referring now to FIG. 3C, hardware processor may execute instruction 326 to initialize the aforementioned parameters to begin monitoring relevant STAs. In particular, N_STA_no_MU(AC), N_STA_MU(AC), and N_STA(AC) are set to values of zero. The parameter, W(AC) may be set to some constant value, C, where 0<C<1.

Hardware processor 302 may execute instruction 328 to monitor received frames of interest to identify those STAs with queued UL data/frames falling into the BE and/or BK ACs. Frames of interest, as noted above, can include the following frames: single-user (SU) UL QoS NULL frames, buffer status report poll (BSRP) and subsequent QoS NULL frames received as part of UL-Orthogonal Frequency Division Multiple Access (OFDMA) transmissions, Basic Trigger Frames and subsequent QoS Data or QoS NULL frames received as part of UL-OFDMA transmissions, and UL SU QoS Data frames.

Hardware processor 302 may execute instruction 330 to determine if a new STA is detected. It should be understood that detection of the new STA may be premised on the STA having queued UL data corresponding to either the BE or BK ACs. If no such STA is detected by hardware processor 302, hardware processor 302 may execute instruction 340 to determine if existing BE and/or BR flows have ended for any STA. If not, hardware processor may return to executing instruction 328 to continue monitoring received frames of interest. On the other hand, if any STA's BE/BK flow(s) have ended, hardware processor 302 may execute instruction 342 to determine if the STA (whose BE/BK flow(s) have ended) is MU capable. If not, hardware processor 302 may execute instruction 344 to decrement the number of non-MU capable STAs with queued UL data corresponding to one/both of the BE or BK ACs. If so, hardware processor 302 may execute instruction 346 to decrement the number of MU capable STAs with queued UL data corresponding to one/both of the BE or BK ACs.

Following execution of either these instructions, hardware processor 302 may execute instruction 338 to update the number of STAs potentially attempting UL SU transmission(s) for the BK and/or BE traffic as well as update relevant EDCA parameters, e.g., the CWmin parameter value. It should be noted that the updated number is a function of the number of non-MU capable STAs with queued UL data (belonging to BE/BK ACs) plus the number of MU capable STAs with queued UL data (belonging to BE/BK ACs) weighted with the W(AC) value.

Accordingly, hardware processor 302 may return to executing instruction 328. As alluded to above, the contention minimization mechanism disclosed herein can be focused on finding the number of contending STAs that have queued UL data in the BK and/or BE ACs so that the CWmin parameter can be adjusted accordingly for these ACs, As described throughout the disclosure, because an AP can leverage information from/regarding any STA associated to itself or to a co-channel AP in the same ESS, a more accurate assessment of this number of STAs can be performed.

If after executing instruction 330, hardware processor 302 determines (upon executing instruction 332) that the detected (new) STA is MU capable, hardware processor 302 may execute instruction 334 to increment the number of MU capable STAs with queued UL data corresponding to the BE and/or BK ACs. If the detected STA is not MU capable, hardware processor 302 may execute instructions 336 to increment the number of non-MU capable STAs with queued UL data corresponding to either the BE and/or BK ACs. Again, in accordance with some embodiments, the contention minimization mechanism contemplated herein seeks to obtain an accurate assessment of the number of STAs contending to transmit UL BE/BK data so that the congestion window parameter can be assigned an appropriate value. Once the numbers of MU and non-MU capable STAs are determined, the number of STAs potentially attempting UL SU transmission can be updated vis-à-vis hardware processor executing instruction 338.

Once the number of potentially contending STAs has been determined using the above mechanism, an AP may calculate the appropriate congestion window setting/value as a function of this number of potentially contending STAs. That is:

$$CWmin(AC)=f(N\_STA(AC))$$

The exact of value of "f" can be configurable, and may further be subject to experimentation, although it should be understood that the function is an increasing function, e.g., the higher the number of STAs, the higher the value of CWmin.

It should be noted that the contention minimization and latency minimization mechanisms described herein may be implemented on each AP in an ESS. Similarly, the frames parsed at an AP should belong to the same ESS. The reason for this is that to improve network performance, an AP will give up on bursting opportunity, with the understanding that the benefits should be reaped only by the STAs in the ESS. That is, if the above-described mechanisms were to be applied across different/multiple ESSs, the APs of an ESS would unfairly lose out on channel access by backing away from bursting opportunities. Moreover, it should be understood that an AP under consideration/executing the aforementioned mechanisms is aware of the other neighboring co-channel APs within its own ESS by virtue of out-of-band information (e.g., from an AP controller).

That said, other embodiments are contemplated, wherein comparisons between different ESSs that are hosted on the same set of neighboring co-channel APs can be made. That is, the aforementioned contention minimization and/or latency minimization can be based on scaling the TX burst and CWmin values up/down in different proportions/ratios for each ESS among a plurality of ESSs. In such embodiments, latency minimization and/or contention minimization parameters may be calculated/effectuated for each ESS, and then each ESS may be compared to one another.

It should be understood that various embodiments are implementable on any AP platform with real-time benefits. Since the 802.11ax enhancements are exploited, embodiments described herein may be better suited for 802.11ax-heavy deployments or APs with 802.11ax-only radios, especially in the Wi-Fi 6/6 GHz context.

Figure 4:
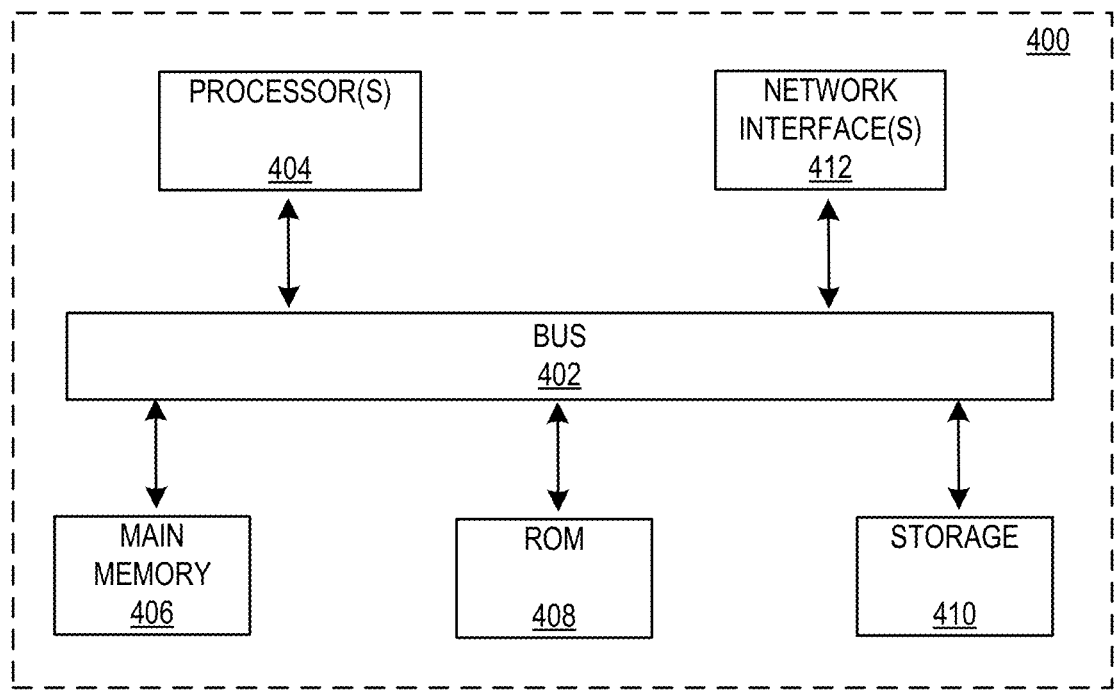
FIG. 4 illustrates an example computing component in which various embodiments described herein may be implemented.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors. Computer system 400 may be an embodiment of an AP controller or AP or similar device.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may further include at least one network interface 412, such as a network interface controller (NIC), network adapter, or the like, or a combination thereof, coupled to bus 402 for connecting computer system 400 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for minimizing latency for uplink (UL) latency-sensitive traffic in a wireless local area network (WLAN), comprising:
    monitoring, by a first access point (AP) in the WLAN operating on a channel, frames of interest received from one or more stations (STAB) associated to both the first AP and a second AP operating on the channel, the first AP and the second AP belonging to a same extended service set (ESS);
    upon the first AP detecting a latency-sensitive flow, reducing a transmission burst duration applicable to non-latency-sensitive flows;
    upon the first AP detecting termination of the latency-sensitive flow, increasing the transmission burst duration applicable to the non-latency-sensitive flows; and
    increasing, in parallel with the monitoring of the received frames of interest, the transmission burst duration applicable to non-latency-sensitive flows upon completion of a periodic interval unless another latency-sensitive flow is detected by the first AP.

2. The method of claim 1, wherein the frames of interest comprise at least one of single user (SU) UL Quality of Service (QoS) NULL frames, buffer status report poll (BSRP) frames, QoS NULL frames received as part of UL Orthogonal Frequency Division Multiple Access (OFDMA) transmissions subsequent to the BSRP frames, Basic Trigger frames, QoS NULL frames received as part of UL OFDMA transmissions subsequent to the Basic Trigger frames, QoS Data frames received as part of UL OFDMA transmissions subsequent to the Basic Trigger frames, UL SU QoS Data frames.

3. The method of claim 1, wherein the latency-sensitive flows comprise flows corresponding to one of a video access category and a voice access category, and wherein the non-latency sensitive flows correspond to one of a background access category and a best effort access category.

4. The method of claim 1, wherein the first AP further increments a flowcount counter upon the first AP detecting the latency-sensitive flow, wherein flowcount is representative of latency-sensitive flows.

5. The method of claim 4, wherein the first AP further decrements the flowcount counter upon the first AP detecting the termination of the latency-sensitive flow.

6. The method of claim 1, wherein upon the first AP detecting one or more subsequent latency-sensitive flows, further reducing the transmission burst duration until a minimum transmission burst duration setting threshold is reached.

7. The method of claim 1, wherein upon the first AP detecting one or more subsequent terminations of the latency-sensitive flows, further increasing the transmission burst duration until a maximum transmission burst duration setting threshold is reached.

8. The method of claim 1, wherein reducing the transmission burst duration comprises a reduction by one-half burst duration of a current transmission burst duration.

9. The method of claim 1, wherein increasing the transmission burst duration comprises an increase by one burst duration of a current transmission burst duration.

10. The method of claim 1, whereupon the first AP, upon detecting additional completions of further periodic intervals, further increasing the transmission burst duration until a maximum transmission burst duration setting threshold is reached.

11. A wireless local area network (WLAN) device operating on a channel in a WLAN, comprising:
    a processor; and
    a memory operatively connected to the processor, the memory including computer code that when executed causes the processor to:
        monitor received frames of interest from one or more stations (STAB) associated to both the WLAN device and a second WLAN device operating on the channel, the second WLAN device belonging to a same extended service set (ESS) as the WLAN device;

upon the WLAN device detecting a latency-sensitive flow, reduce a transmission burst duration applicable to non-latency-sensitive flows;

upon the WLAN device detecting termination of a latency-sensitive flow, increase the transmission burst duration applicable to the non-latency-sensitive flows; and in parallel with the monitoring, the detecting, the reducing, and the increasing, further increase the transmission burst duration applicable to the non-latency-sensitive flows upon completion of a periodic interval.

12. The WLAN device of claim 11, wherein reducing the transmission burst duration amounts to halving a current transmission burst duration, and wherein the increase of the transmission burst duration due to either the detected termination of the latency-sensitive flow or the completion of the periodic interval amounts to increasing the current transmission burst duration by a value of one.

13. The WLAN device of claim 11, wherein the computer code that when executed causes the processor to increase the transmission burst duration upon completion of a periodic interval causes the increase only if a latency-sensitive flow is not detected during the periodic interval.

14. The WLAN device of claim 11, wherein the memory includes computer code that when executed further causes the processor to limit reduction of the transmission burst duration to a minimum allowed transmission burst duration, and to limit the increase of the transmission burst duration to a maximum allowed transmission burst duration.

15. The WLAN device of claim 11, wherein latency-sensitive flows comprise flows corresponding to one of a video access category and a voice access category, and wherein the non-latency sensitive flows correspond to one of a background access category and a best effort access category.

* * * * *